US 8,427,285 B2

(12) United States Patent
Wilson et al.

(10) Patent No.: US 8,427,285 B2
(45) Date of Patent: Apr. 23, 2013

(54) CONFIGURABLE CONTROL OF DATA STORAGE DEVICE VISUAL INDICATORS IN A SERVER COMPUTER SYSTEM

(75) Inventors: Larry E Wilson, Tomball, TX (US);
Masud M Reza, Cypress, TX (US);
Hank Dao, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 12/770,207

(22) Filed: Apr. 29, 2010

(65) Prior Publication Data

US 2011/0267188 A1 Nov. 3, 2011

(51) Int. Cl.
*G08B 9/00* (2006.01)
*G06F 11/00* (2006.01)

(52) U.S. Cl.
USPC .............. 340/286.02; 340/286.01; 340/691.8; 714/4.1

(58) Field of Classification Search ............. 340/286.01, 340/286.05, 286.06, 286.07, 539.16, 539.17, 340/539.19, 635, 286.02, 691.1, 691.8; 370/252, 370/254; 707/999.205; 709/220, 223; 714/4.1
See application file for complete search history.

(56) References Cited

U.S. PATENT DOCUMENTS

| | | | |
|---|---|---|---|
| 7,535,851 B2* | 5/2009 | Dube et al. | 370/252 |
| 7,956,688 B2* | 6/2011 | Ahmed et al. | 330/254 |
| 2006/0143255 A1* | 6/2006 | Shinohe et al. | 707/205 |
| 2007/0078987 A1* | 4/2007 | Walker et al. | 709/227 |
| 2007/0220301 A1* | 9/2007 | Brundridge et al. | 714/4 |

* cited by examiner

*Primary Examiner* — Van T. Trieu

(57) ABSTRACT

A server computer system includes a set of visual indicators for representing status of one or more data storage devices that are connected to one or more nodes of the server system. Control circuitry has at least first and second bus interfaces and is configured to set the state of the visual indicators responsive to signals received through the bus interfaces, and to operate in at least first and second configurable modes. In the first mode, both of the first and the second bus interfaces communicate with a single node. In the second mode, the first bus interface communicates with a first node and the second bus interface communicates with a second node.

20 Claims, 10 Drawing Sheets

|     | NODE C | NODE D | NODE B | NODE A |
|-----|--------|--------|--------|--------|
| HDD | C1 | D1 | B1 | A1 |
|     | C2 | D2 | B2 | A2 |
|     | C3 | D3 | B3 | A3 |

| 0 | 0 |
|---|---|

SWITCH SETTINGS FOR
4NODE, 3HDD PER NODE

*FIG. 2*

|     | NODE D | | NODE A | |
|-----|--------|--------|--------|--------|
| HDD | BLANK | BLANK | BLANK | BLANK |
|     | D1 | D3 | A1 | A3 |
|     | D2 | D4 | A2 | A4 |

| 0 | 1 |
|---|---|

SWITCH SETTINGS FOR
2NODE, 4HDD PER NODE

*FIG. 4*

|     | NODE D | | NODE A | |
|-----|--------|--------|--------|--------|
| HDD | D4 | D1 | A4 | A1 |
|     | D5 | D2 | A5 | A2 |
|     | D6 | D3 | A6 | A3 |

| 1 | 1 |
|---|---|

SWITCH SETTINGS FOR
2NODE, 6HDD PER NODE

*FIG. 6*

CONFIGURABLE CONTROL OF DATA STORAGE DEVICE VISUAL INDICATORS IN A SERVER COMPUTER SYSTEM

BACKGROUND

A server computer system often includes multiple processing units called nodes. A node typically includes a main circuit board known as a motherboard. The motherboard hosts one or more central processing units and some associated memory. Each node in a server system may be connected via cables to one or more data storage devices such as hard disk drives, optical disk drives and the like. While a node may be connected to multiple data storage devices, generally a data storage device is connected to only one node.

For each data storage device, one or more visual indicators are provided to display information related to disk activity and error status for the device, as well as to "locate" the device by visually distinguishing it from other similar devices when necessary for maintenance or replacement activities. Illumination elements such as light-emitting diodes ("LEDs") are typically used for this purpose. It is often necessary to mount these visual indicators on the server enclosure at a distance from the storage devices to which they correspond. A hard-wired backplane is used in prior art server systems to connect the storage devices in a fixed manner to certain predetermined ones of the visual indicators mounted on the server enclosure. The backplane may be a printed circuit board.

Manufacturers allow customers to choose various configurations of nodes and storage devices when the customers purchase server systems. For example, one server configuration might specify four nodes with three storage devices per node. Another server configuration might specify two nodes with six storage devices per node. Yet another server configuration might specify two nodes with four storage devices per node and so on. In prior art server systems, each such configuration corresponded to a different backplane design. Thus a manufacturer had to produce as many different backplanes as the number of server configurations that it wanted to offer to its customers.

BRIEF DESCRIPTION OF THE DRAWINGS

FIG. 2 is a table illustrating an assignment of data storage device visual indicators to the nodes of FIG. 1, with corresponding mode switch settings.

FIG. 4 is a table illustrating an assignment of data storage device visual indicators to the nodes of FIG. 3, with corresponding mode switch settings.

FIG. 6 is a table illustrating an assignment of data storage device visual indicators to the nodes of FIG. 5, with corresponding mode switch settings.

DETAILED DESCRIPTION

The inventors hereof have devised a technique for configurable control of data storage device visual indicators in a server computer system. Using the inventive technique, manufacturers need only design and build a single type of backplane and may use the single backplane in a variety of differently configured server systems. Thus the cost of designing and maintaining multiple backplanes is eliminated.

Figure 1A:
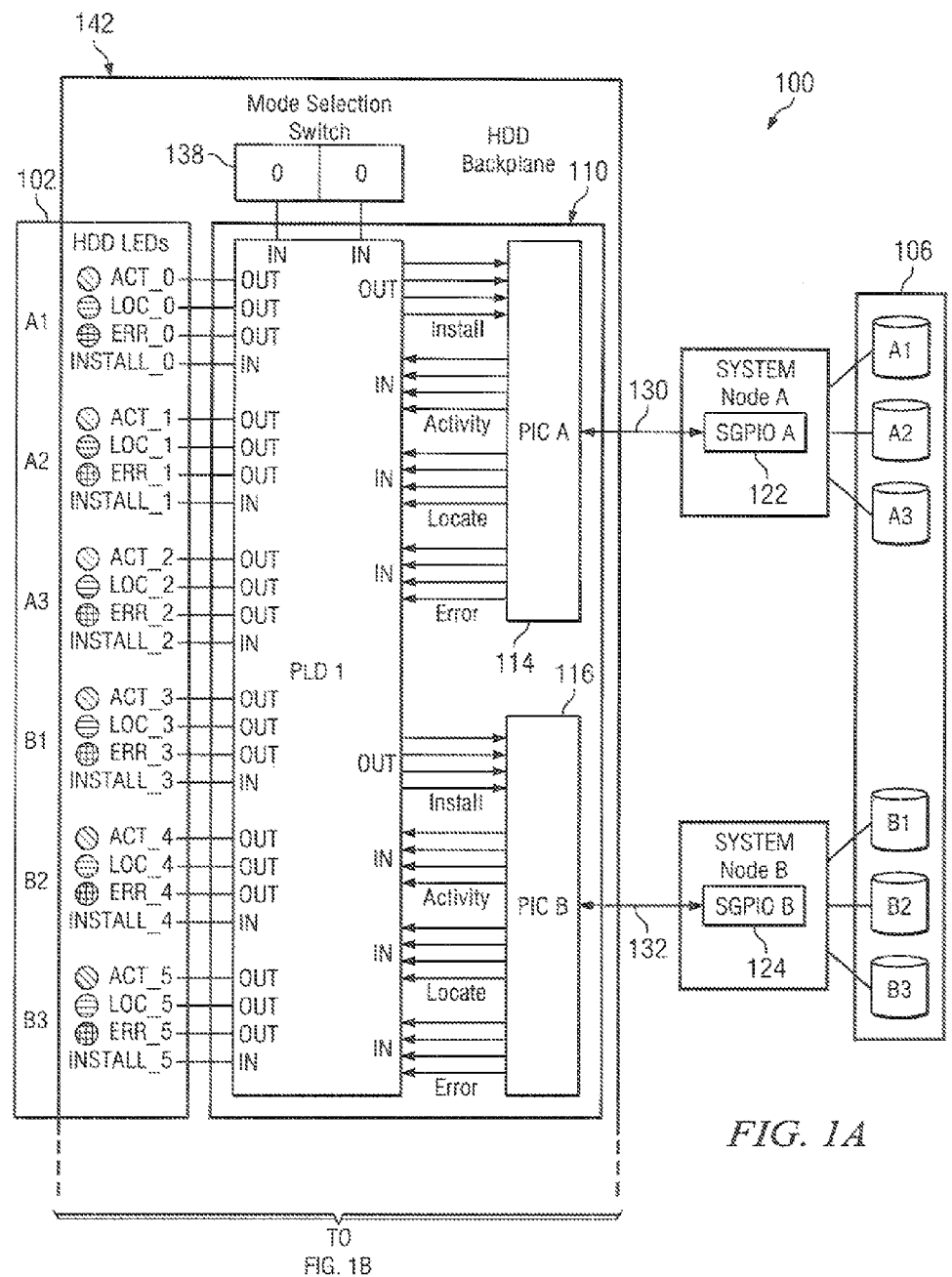
FIG. 1 is a block diagram illustrating a server computer system according to an example embodiment of the invention wherein four nodes are present, each attached to three data storage devices.
Figure 1B:
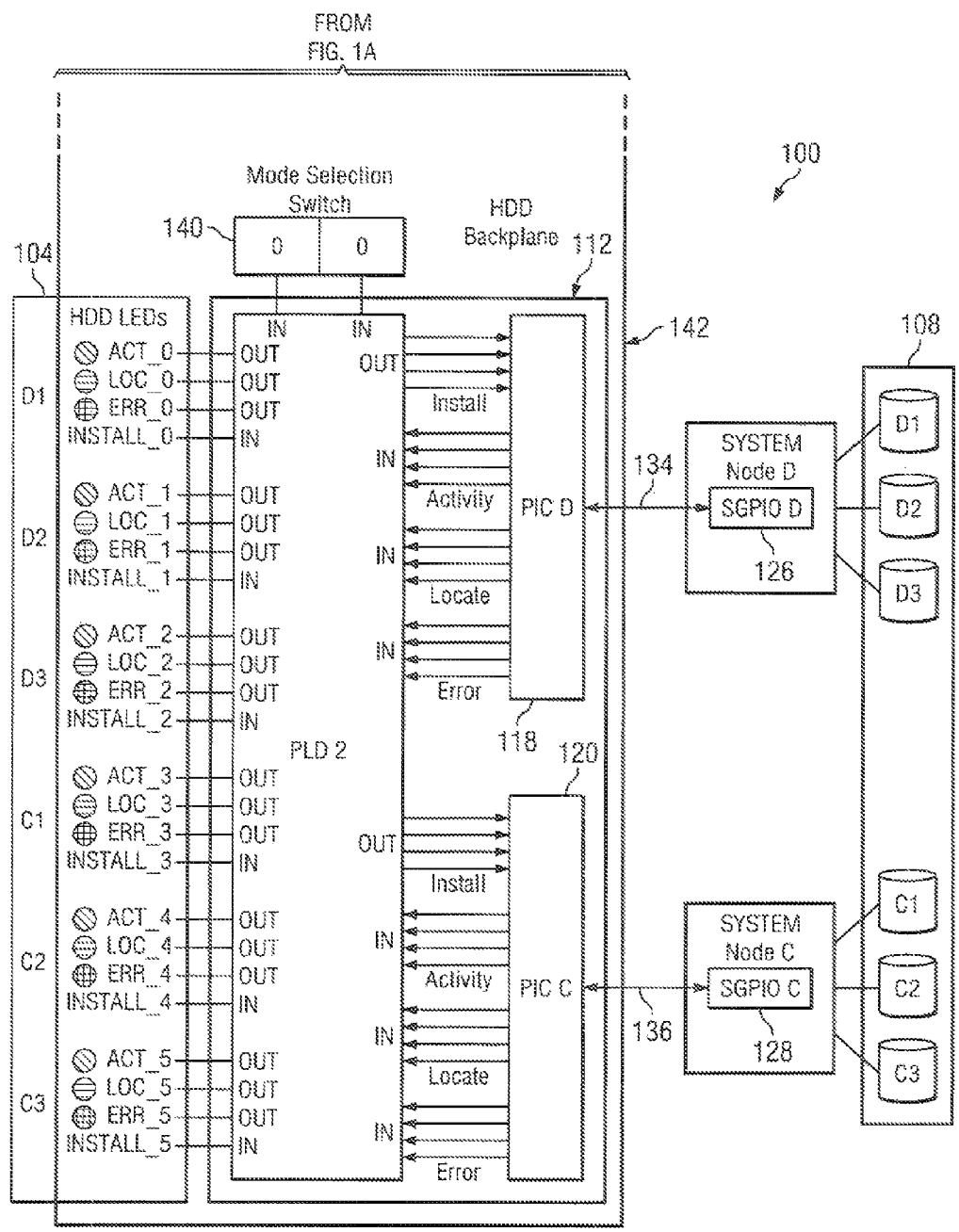

FIG. 1 shows an example server computer system 100 that demonstrates a class of embodiments. System 100 includes sets 102, 104 of visual indicators for representing the status of one or more data storage devices 106, 108. Visual indicators 102, 104 may take any conventional form. For example, LEDs may be used. Similarly, data storage devices 106, 108 may be of any type, including without limitation magnetic storage devices such as hard disk drives or tape drives, as well as optical storage devices such as CD drives or DVD drives. Various types of status may be represented by the visual indicators without deviating from the scope of the invention. In some embodiments, each data storage device is associated with an activity indication ACT0-ACT5, an error indication ERR0-ERR5 and a locate indication LOC0-LOC5. In additional embodiments, an install input INSTALL0-INSTALL5 may be included with the visual indicators that are associated with a particular data storage device. The install inputs may be used to indicate to control circuitry 110, 112 that the particular data storage device has been installed and is present in server system 100. Visual indicators 102, 104 may be located on backplane 142 or may be mounted in any other suitable location in or near server system 100, such as on or near the surface of an enclosure for server system 100.

Each block of control circuitry 110, 112 includes at least two bus interfaces 114-120. In the embodiment shown, the bus interfaces within control circuitry 110, 112 are integrated within programmable interrupt controllers ("PIC") PICA-PICB. In other embodiments, the bus interfaces may be discrete components or may be integrated within other subsystems. In system 100, each of nodes A-D includes a corresponding bus interface 122-128. The bus interfaces enable control circuitry 110, 112 and nodes A-D to communicate with one another over buses 130-136. For example, each node may communicate the state of its data storage devices to the control circuitry via a bus, and the control circuitry may communicate the state of an install input to a node via a bus. Buses 130-136 may take any form, including without limitation various types of known serial or parallel bus systems. In the embodiment shown, the buses are serial, general-purpose input/output ("SGPIO") buses.

Control circuitry 110, 112 is configured to set the state of visual indicators 102, 104 according to information it receives from the nodes over buses 130-136 through bus interfaces 122-128 and 114-120.

Control circuitry 110, 112 is also configured to operate in several different modes responsive to mode selection circuitry 138, 140. Mode selection circuitry 138, 140 may take any form suitable for enabling a user or administrator to indicate a mode value that will be maintained and communicated to control circuitry 110, 112. For example, mode selection circuitry 138, 140 may take the form of jumpers or switches that can be adjusted manually to indicate one or more binary values as shown. The mode setting stored in mode selection circuitry 138, 140 serves to indicate not only how many nodes will be present in system 100, but also how many data storage devices will be connected to each node. The mode setting also implicitly indicates to control circuitry 110, 112 which of the visual indicators 102, 104 should be associated with which of the data storage devices 106, 108. In different modes, the same signal set may be routed to different visual indicators. Thus the same visual indicator may be associated with one data storage device and/or node in one mode, and may be associated with a different data storage device and/or node in another mode.

Control circuitry 110, 112 may accomplish these associations in various ways, such as by using switches and/or multiplexers. In the embodiment shown, PICs A-D are used to translate activity, locate, error and input signal sets to and from the protocol of buses 130-136, while programmable logic devices ("PLD") 1 and 2 are used to route those signal sets to and from the appropriate visual indicators.

One class of possible modes is demonstrated by mode setting 00, which has been selected in FIG. 1. In mode setting 00, each of bus interfaces 114-120 communicates with a different node. Specifically, bus interface 114 communicates with node A, bus interface 116 communicates with node B, bus interface 120 communicates with node C, and bus interface 118 communicates with node D. In mode 00, the subset of indicators ACT0-2, LOC0-2, ERR0-2 and the inputs INSTALL0-2 within set 102 are associated with data storage devices A1-A3, respectively, attached to node A. The subset of indicators ACT3-5, LOC3-5, ERR3-5 and the inputs INSTALL3-5 within set 102 are associated with data storage devices B1-B3, respectively, attached to node B. Similarly, the subset of indicators ACT0-2, LOC0-2, ERR0-2 and the inputs INSTALL0-2 within set 104 are associated with data storage devices D1-D3, respectively, attached to node D. The subset of indicators ACT3-5, LOC3-5, ERR3-5 and the inputs INSTALL3-5 within set 104 are associated with data storage devices C1-C3, respectively, attached to node C.

FIG. 2 illustrates one possible physical arrangement of data storage devices and/or visual indicators in server system 100. As shown, the data storage devices or indicators may be mounted in a rectangular matrix such that, in mode 00, each column of the matrix houses only the data storage devices or indicators that are associated with one node.

Figure 3A:
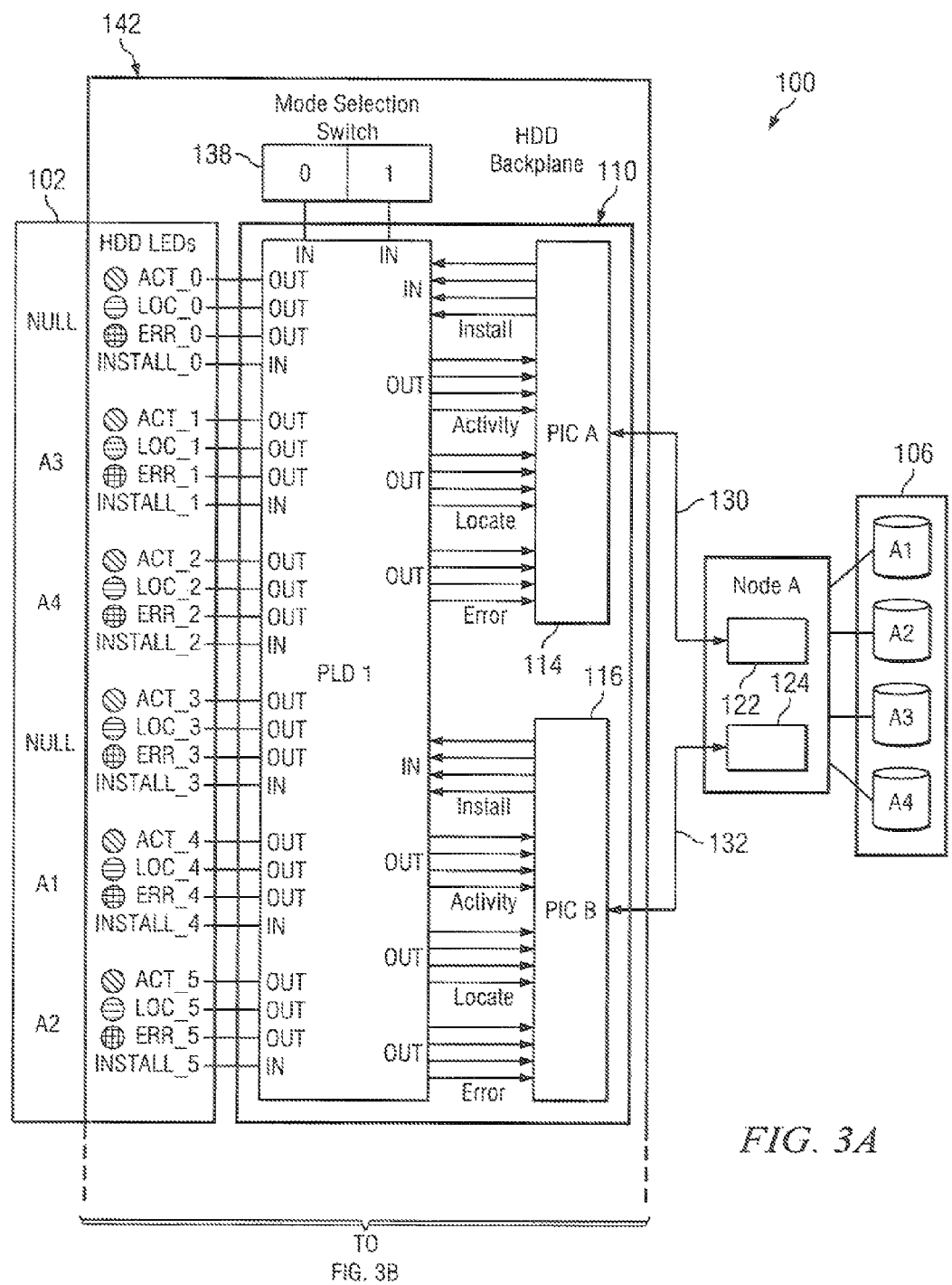
FIG. 3 is a block diagram illustrating a server computer system according to an example embodiment of the invention wherein two nodes are present, each attached to four data storage devices.
Figure 3B:
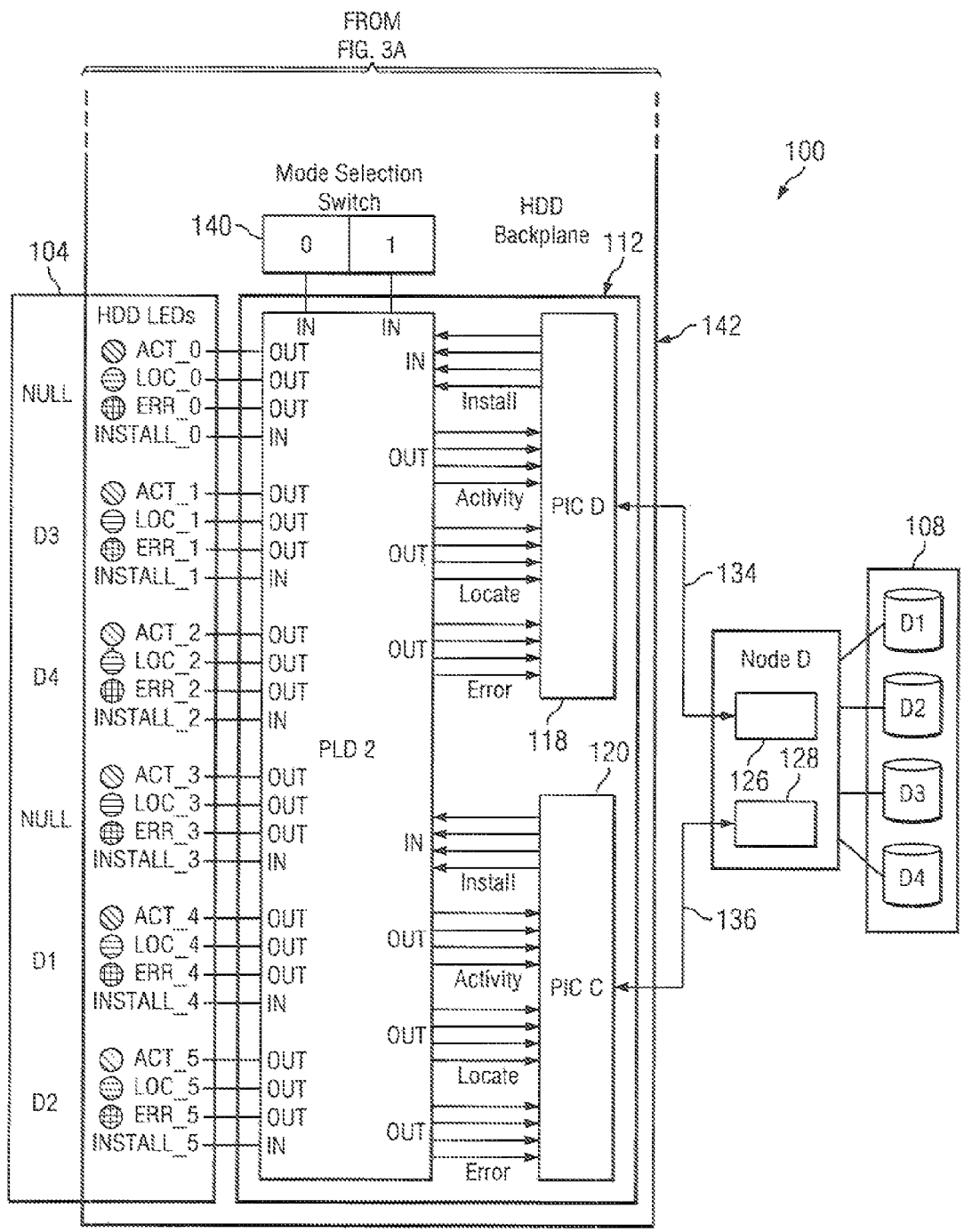

FIG. 3 demonstrates another class of possible modes. In mode 01, which is selected in FIG. 3, only two nodes are present in system 100, and each node is connected to four data storage devices. In this case, node A includes two bus interfaces 122, 124 for communicating with bus interfaces 114, 116, respectively. Thus both of bus interfaces 114, 116 communicate with a single node in this mode. Similarly, bus interfaces 118, 120 communicate with corresponding bus interfaces 126, 128, which are both located on a single node, node D. All of the active indicators in set 102 are associated with a single node, node A. And all of the active indicators in set 104 are associated with a single node, node D. Specifically, indicators ACT1/2/4/5, LOC 1/2/4/5, ERR1/2/4/5 and inputs INSTALL1/2/4/5 in set 102 are associated with data storage devices A1-4, respectively, attached to node A. Indicators ACT0/3, LOC0/3, ERR0/3 and inputs INSTALL0/3 in set 102 are inactive. Indicators ACT1/2/4/5, LOC1/2/4/5, ERR1/2/4/5 and inputs INSTALL1/2/4/5 in set 104 are associated with data storage devices D1-4, respectively, attached to node D. Indicators ACT0/3, LOC0/3, ERR0/3 and inputs INSTALL0/3 in set 104 are inactive.

FIG. 4 illustrates a possible physical arrangement of the data storage devices and/or visual indicators in system 100 when mode 01 is selected. As shown, two columns of the matrix may be associated with each node, and four of the slots may be inactive.

Figure 5A:
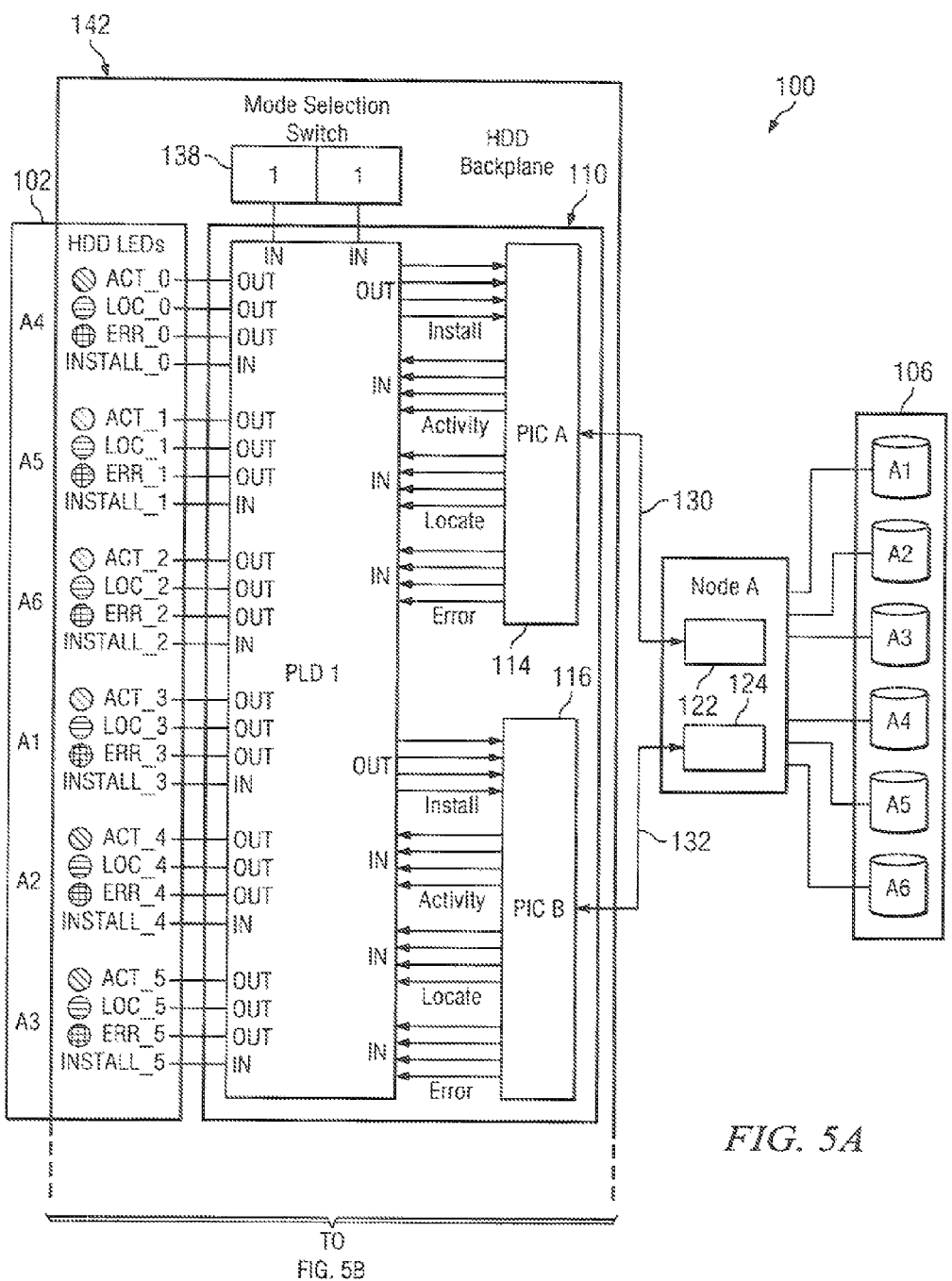
FIG. 5 is a block diagram illustrating a server computer system according to an example embodiment of the invention wherein two nodes are present, each attached to six data storage devices.
Figure 5B:
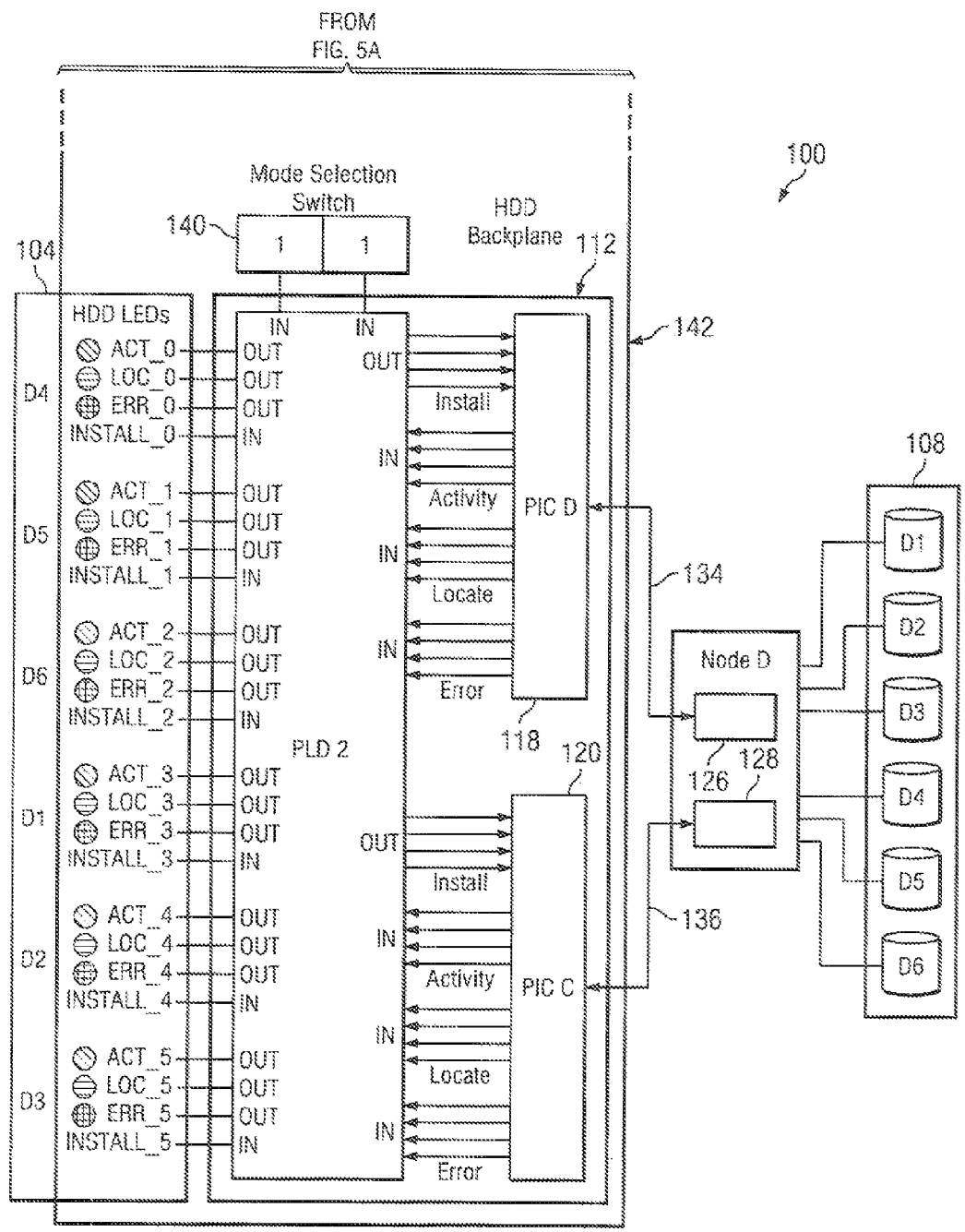

FIG. 5 demonstrates another possible class of modes. In mode 11, which is selected in FIG. 5, only two nodes are present in system 100, but each node is now connected to six data storage devices instead of four. As was the case in mode 01, each node includes two bus interfaces. In mode 11, all of the active indicators in set 102 are associated with data storage devices A1-A6 attached to node A; none are inactive. And all of the active indicators in set 104 are associated with data storage devices D1-D6 attached to node D; none are inactive.

FIG. 6 illustrates a possible physical arrangement of the data storage devices and/or visual indicators in system 100 when mode 11 is selected. As shown, two columns of the matrix may be associated with each node, with none of the slots inactive.

Figure 7A:
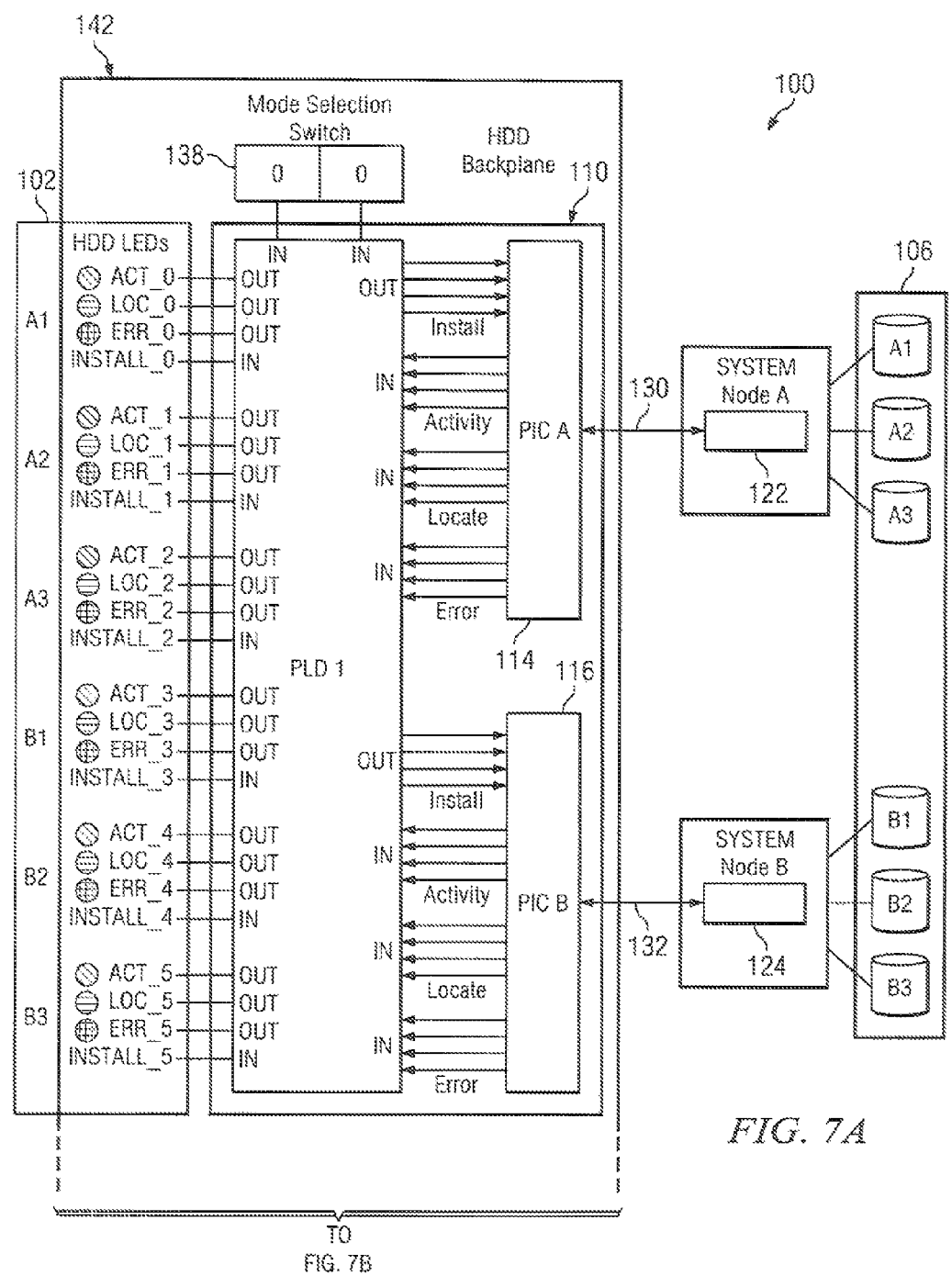
FIG. 7 is a block diagram illustrating a server computer system according to an example embodiment of the invention wherein three nodes are present, with two of the nodes attached to three storage devices each and one node attached to four storage devices.
Figure 7B:
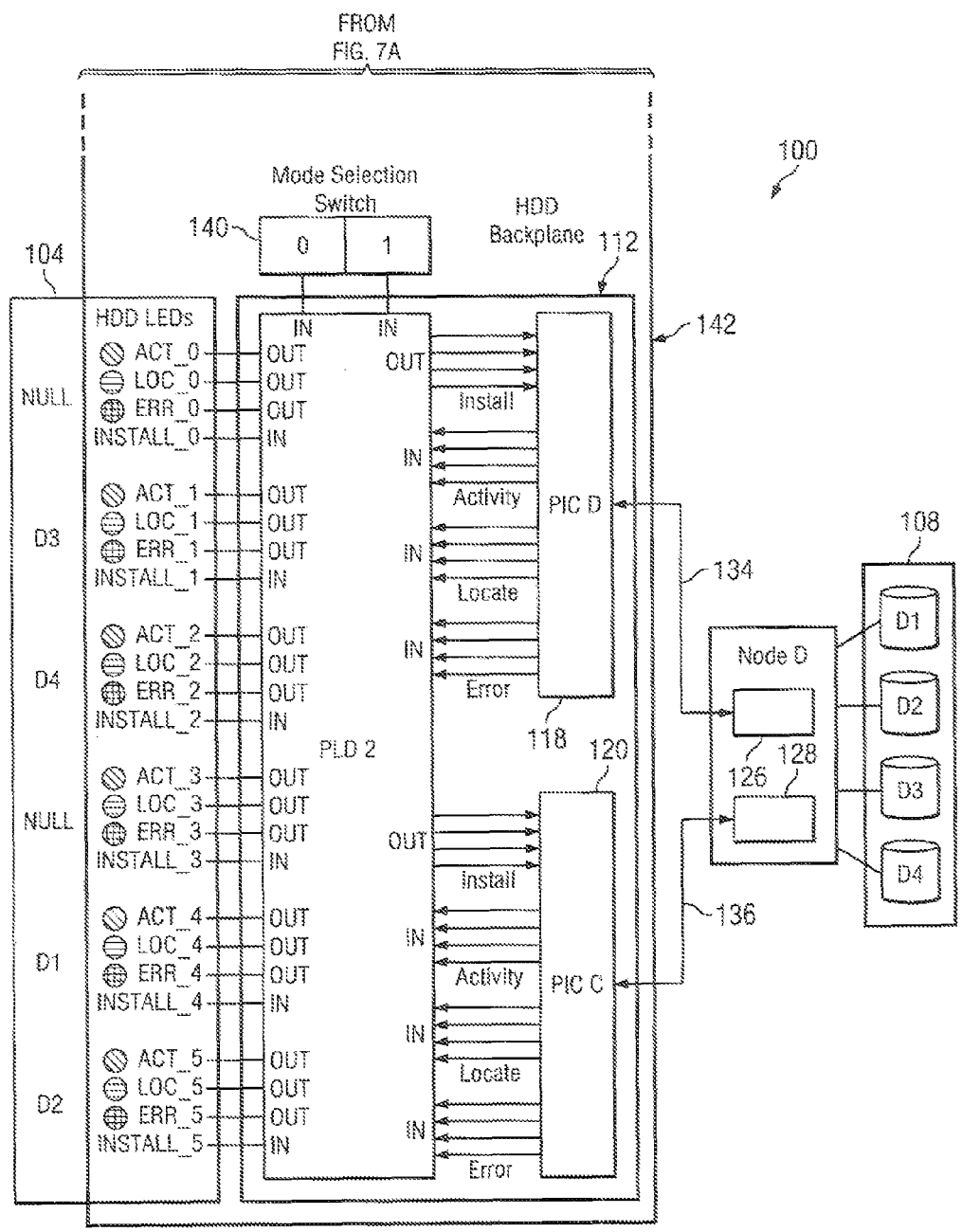

Finally, FIG. 7 demonstrates a class of possible hybrid modes in which mode selection circuitry 138 may be set differently than mode selection circuitry 140. Alternatively, a single mode selection circuitry may be used and control circuitry 110, 112 may be designed to behave differently from one another in certain modes. In the configuration shown in FIG. 7, the visual indicators in set 102 are divided among data storage devices attached to two separate nodes A and B, while the visual indicators in set 104 are all associated with data storage devices attached to a single node, node D.

Many other permutations and combinations of the foregoing are possible, and mode selection circuitry 138, 140 need not be limited to a two digit binary value; instead the mode selection circuitry may comprise any number of digits. Moreover, some embodiments may comprise only a single mode selection and control circuitry instead of two as shown in the example embodiments. Other embodiments may comprise more than two. Similarly, the number of nodes and storage devices in system 100 need not be limited to those shown in the foregoing examples.

Figure 8:
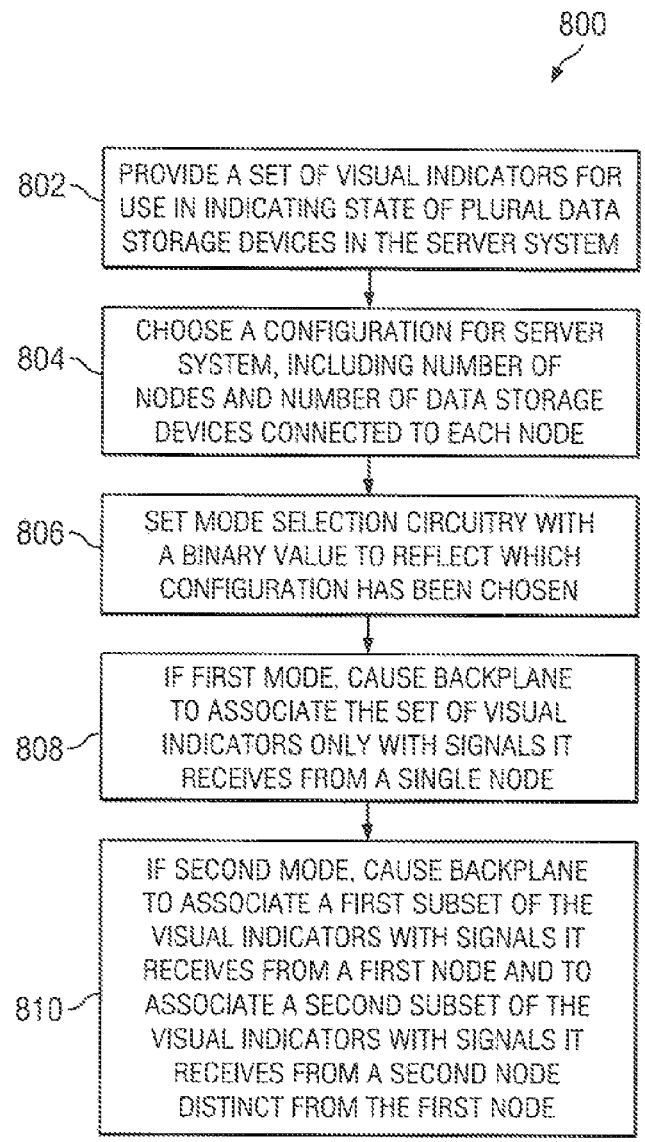
FIG. 8 is a flow diagram illustrating a method of configuring the control of data storage device visual indicators in a server computer system according to an example embodiment of the invention.

FIG. 8 illustrates a method 800 of configuring the control of data storage device visual indicators in a server computer system according to an example embodiment of the invention. In step 802, a set of visual indicators such as indicators 102 and/or 104 are provided for indicating the state of data storage devices such as devices 106 and/or 108 in a server computer system such as system 100. In step 804, a configuration is chosen for the server system, including for example a number of nodes and a number of data storage devices to be connected to each node. In step 806, mode selection circuitry such as circuitry 138 and/or 140 is set with a binary value to indicate a mode that reflects the chosen configuration. The binary value may comprise more than one binary digit. The value may implicitly indicate the number of nodes in the server system as well as the number of data storage devices connected to the nodes. The value may be set, for example, by adjusting one or more switches or jumpers located on a backplane of the server system.

In steps 808 and 810, if a first mode is chosen, the backplane of the server system is caused to associate the visual indicators on with signals received from a single node of the server system. But if a second mode is chosen, the backplane is caused to associate one subset of the visual indicators with signals received from a first node, and to associate another subset of the visual indicators with signals received from a second node distinct from the first node.

While the invention has been described in detail with reference to certain embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A server computer system, comprising:
a set of visual indicators for representing status of one or more data storage devices that are connected to one or more nodes of the server system;
control circuitry having at least first and second bus interfaces;
wherein the control circuitry is configured to set the state of the visual indicators responsive to signals received through the bus interfaces and to operate in at least first and second configurable modes such that:
in the first mode, both of the first and the second bus interfaces communicate with a single node; and
in the second mode, the first bus interface communicates with a first node and the second bus interface communicates with a second node.

2. The system of claim 1, wherein:
in the first mode, the set of visual indicators is associated with data storage devices connected to the single node; and
in the second mode, one subset of the visual indicators is associated with data storage devices connected to the first node and a second subset of the visual indicators is associated with data storage devices connected to the second node.

3. The system of claim 1, further comprising:
a set of switches or jumpers that can be set and reset manually and that are configured to determine the mode in which the control circuitry operates.

4. The system of claim 1, wherein:
the control circuitry comprises a programmable logic device configured to set the state of the visual indicators; and
at least two programmable interrupt controllers, each associated with a different one of the bus interfaces, and each configured to provide inputs to the programmable logic device for indicating status of a data storage device.

5. The system of claim 1, wherein:
each of the visual indicators comprises an activity indication, an error indication and a locate indication.

6. The system of claim 1, further comprising:
an install input to the control circuitry, wherein the install input is associated with one of the visual indicators; and
wherein the control circuitry is configured to communicate, via one of the bus interfaces, a state of the install input to the node with which the one visual indicator corresponds.

7. A method of controlling a set of data storage device visual indicators in a server computer system having a backplane that is configured to receive signals from one or more nodes and to set the state of the visual indicators responsive to the signals received, comprising:
choosing one of at least two different configurations for the server system, wherein the different configurations are characterized by a number of nodes and a number of data storage devices connected to each node;
if a first one of the two configurations is chosen, setting a first binary value using mode selection circuitry such that the backplane associates the set of visual indicators only with signals it receives from a single node; and
if a second one of the two configurations is chosen, setting a second binary value using the mode selection circuitry such that the backplane associates a first subset of the visual indicators with signals it receives from a first node and associates a second subset of the visual indicators with signals it receives from a second node distinct from the first node.

8. The method of claim 7, wherein:
setting the first or the second binary value determines not only how many nodes the backplane associates with the set of visual indicators, but also which of the visual indicators the backplane associates with which data storage devices.

9. The method of claim 7, wherein:
setting the first or the second binary value comprises setting at least one switch or jumper located on the backplane.

10. A server computer system, comprising:
at least first and second visual indicators; and
multimode control circuitry configured to:
in a first mode, control the first and second visual indicators so that they respectively represent status of first and second data storage devices that are both connected to a single node of the server system; and
in a second mode, control the first visual indicator to represent status of a data storage device connected to a first node of the server system, and control the second visual indicator to represent status of a data storage device connected to a second node of the server system distinct from the first node.

11. The system of claim 10, wherein:
the control circuitry comprises at least two bus interfaces, each bus interface configured to communicate with a corresponding bus interface on a node for the purpose of determining status of one or more data storage devices connected to the node.

12. The system of claim 11, wherein:
in the first mode, the at least two bus interfaces in the control circuitry both communicate with the same node and, in the second mode, each of the at least two bus interfaces in the control circuitry communicates with a different node.

13. The system of claim 11, further comprising:
at least one install input on the control circuitry, the install input associated with one of the visual indicators; and
wherein the control circuitry is configured to communicate a state of the install input, via one of the bus interfaces, to a node with which the one visual indicator corresponds.

14. The system of claim 11, wherein:
the bus interfaces are serial interfaces.

15. The system of claim 10, further comprising:
configurable mode selection circuitry; and
wherein the control circuitry operates responsive to a state of the configurable mode selection circuitry.

16. The system of claim 15, wherein:
the configurable mode selection circuitry comprises switches or jumpers that can be set and reset manually.

17. The system of claim 15, wherein:
the mode selection circuitry and the control circuitry are located on a backplane.

18. The system of claim 15, wherein the control circuitry further comprises:
a programmable logic device configured to set the state of each visual indicator; and first and second programmable interrupt controllers, each configured to provide inputs to the programmable logic device for indicating status of one or more data storage devices;

wherein operation of the programmable logic device is responsive to the state of the configurable mode selection circuitry.

19. The system of claim 10, wherein:

each visual indicator comprises an activity indication, an error indication and a locate indication.

20. The system of claim 10, wherein:

each visual indicator comprises at least one LED.

* * * * *